United States Patent Office 3,117,144
Patented Jan. 7, 1964

3,117,144
$\Delta^1$ AND $\Delta^{1,3}$-PREGNENES AND DERIVATIVES THEREOF
Alexander D. Cross, Mexico City, Mexico, assignor to Syntex Corporation, Panama, Panama, a corporation of Panama
No Drawing. Filed Oct. 19, 1962, Ser. No. 231,835
17 Claims. (Cl. 260—397.45)

The present invention relates to novel cyclopentano-phenanthrene derivatives and to a process for the production thereof.

More particularly the present invention relates to novel $\Delta^1$ and $\Delta^{1,3}$-3-desoxy derivatives of cortical hormones.

The novel compounds of the present invention are represented by the following formula:

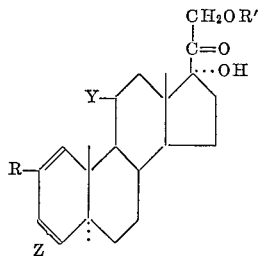

In the above formula R represents hydrogen or methyl; $R^1$ represents hydrogen or a hydrocarbon carboxylic acyl group of less than 12 carbon atoms; Y represents a β-hydroxy group or a keto group; Z represents a double bond or a saturated linkage, each between C-3 and C-4.

The acyl group is derived from hydrocarbon carboxylic acids containing less than 12 carbon atoms which may be saturated or unsaturated, of straight, branch, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formula are valuable cortical hormones with high anti-inflammatory, low catabolic, glycogenic and thymolytic activities. In addition, they are anti-androgenic, anti-gonadotrophic and anti-estrogenic hormones. Furthermore, they have high topical activity in skin disorders such as psoriasis, allergic dermatitis and the like.

The noel compounds of the present invention are prepared by the process represented by the following formula scheme:

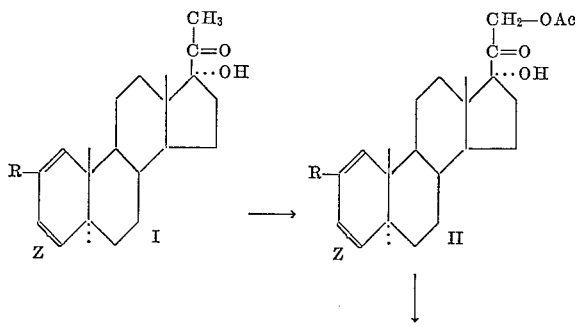

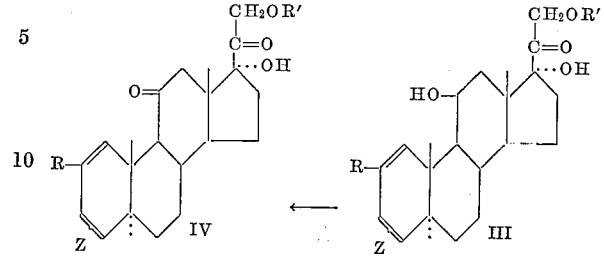

In the above formula R, $R^1$, and Z have the same meaning as previously set forth and Ac represents the acetyl radical.

In practicing the process just outlined, the starting $\Delta^1$-allopregnen-17α-ol-20-one or the 2-methyl and/or $\Delta^3$-derivatives thereof (I), obtained in accordance with my copending U.S. patent application, Serial No. 231,834, filed of even date from the known acetate of allopregnan-3β, 17α-diol-20-one by conventional protection of the 20-ketone followed by conversion of the 3β-acyloxy group successively into 3β-hydroxy, 3-ketone, conventional introduction of the 2α-methyl substituent, conventional bromination in position 2, dihydrobromination to the corresponding $\Delta^1$-3-keto-compound, reduction to 3β-hydroxy, chlorination to 3β-chloro and dehydrochlorination to the $\Delta^{1,3}$-derivative or reduction to the $\Delta^1$-deschloro followed by final reconversion to the 20-keto group, is treated with iodine in the presence of calcium oxide to give the corresponding 21-iodo derivative, which upon treatment with recently fused potassium acetate in acetone, preferably at reflux temperature, yields 21-acetoxy-$\Delta^1$-allopregnen-17α-ol-20-one or the 2-methyl and/or $\Delta^3$-derivative thereof (II). The latter compound (II) upon conventional saponification in a basic medium affords the corresponding 21-free alcohol which upon treatment with *Cunninghamella bainieri* ATCC 9244 in a medium suitable for the survival of said microorganism, such as a mixture of 2% peptone and 5% corn syrup in water, at 28° C. for approximately 24 hours, furnishes the corresponding $\Delta^1$-allopregnene-11β,17α,21-triol-20-one (III: $R^1$=H). The latter 21-free alcohols are conventional acylated in pyridine with a suitable aclyating agent, such as an anhydride or a chloride of a hydrocarbon carboxylic acid of the type defined hereinbefore, thus affording the corresponding 21-acylates (III: $R^1$=acyl), which upon conventional oxidation, as by treatment with chromium trioxide, yield the corresponding 11-ketones (IV: $R^1$=acyl).

The latter compounds having a 21-acyloxy group are saponified by conventional treatment with a base, to produce the corresponding 21-free alcohols which, in turn, may be acylated conventionally in pyridine with an acylating agent to give the corresponding 21-acylates, wherein the acyl group may be different from the previously saponified one.

The following specific examples serve to illustrate the present invention, but are not intended to limit the scope thereof.

*Example I*

A cooled solution of 4 g. of $\Delta^1$-allopregnen-17α-ol-20-one (obtained according to my U.S. pat. appl. Serial No. 231,834 filed of even date), in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration thus giving the 21-iodo derivative of the starting material. This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding 21-acetoxy $\Delta^1$-allopregnen-17$\alpha$-ol-20-one.

Following the same procedure, the compounds listed under A (obtained in accordance with my aforesaid patent application), were respectively converted into the products set forth under B.

A $\Delta^{1,3}$-allopregnadien-17$\alpha$-ol-20-one,
2-methyl-$\Delta^{1,3}$-allopregnadien-17$\alpha$-ol-20-one,
2-methyl-$\Delta^1$-allopregnen-17$\alpha$-ol-20-one

B 21-acetoxy-$\Delta^{1,3}$-allopregnadien-17$\alpha$-ol-20-one
21-acetoxy-2-methyl-$\Delta^{1,3}$-allopregnadien-17$\alpha$-ol-20-one
21-acetoxy-2-methyl-$\Delta^1$-allopregnen-17$\alpha$-ol-20-one.

*Example II*

A suspension of 1 g. 21-acetoxy-$\Delta^1$-allopregnen-17$\alpha$-ol-20-one in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield, $\Delta^1$-allopregnene-17$\alpha$,21-diol-20-one.

By the same procedure, the rest of the final compounds of the preceding example, were respectively converted into:

$\Delta^{1,3}$-allopregnadiene-17$\alpha$,21-diol-20-one,
2-methyl-$\Delta^{1,3}$-allopregnadiene-17$\alpha$,21-diol-20-one, and
2-methyl-$\Delta^1$-allopregnene-17$\alpha$,21-diol-20-one.

*Example III*

A culture of *Cunninghamella bainieri* ATCC 9244 was prepared by inoculating an aqueous medium which contained 2% of peptone and 5% of corn syrup with a vegetating growth of the above culture in the same medium and stirring at 28° C. with aeration for 24 hours.

To 340 cc. of this culture there was then added 10 cc. of 1% ethanolic solution of $\Delta^1$-allopregnene-17$\alpha$,21-diol-20-one the mixture was stirred with aeration at 28° C. for 24 hours. The product of this incubation was extracted several times with methylene chloride, the extract was washed with water, dried over sodium sulfate, filtered and concentrated to a small volume under reduced pressure.

The concentrated extracts were adsorbed on a column prepared with 20 g. of silica gel and 20 g. of celite, washed previously with methylene chloride. Elution and crystallization of the eluates gave $\Delta^1$-allopregnene-11$\beta$,17$\alpha$,21-triol-20-one.

The rest of the final compounds of Example II were treated in accordance with the above procedure, yielding respectively:

$\Delta^{1,3}$-allopregnadiene-11$\beta$,17$\alpha$,21-triol-20-one,
2-methyl-$\Delta^{1,3}$-allopregnadiene-11$\beta$,17$\alpha$,21-triol-20-one, and
2-methyl-$\Delta^1$-allopregnene-11$\beta$,17$\alpha$,21-triol-20-one.

*Example IV*

A mixture of 1 g. of $\Delta^1$-allopregnene-11$\beta$,17$\alpha$,21-triol-20-one 4 cc. of pyridine and 2 cc. of acetic anhydride was kept at room temperature overnight, poured into ice water, the formed precipitate was filtered, washed with water and dried. Crystallization from acetone-hexane gave $\Delta^1$-allopregnene-11$\beta$,17$\alpha$,21-triol-20-one 21-acetate.

When applying the same procedure to the rest of the compounds obtained by the method of Example III, there were respectively produced:

$\Delta^{1,3}$-allopregnadiene-11$\beta$,17$\alpha$,21-triol-20-one, 21-acetate,
2-methyl-$\Delta^{1,3}$-allopregnadiene-11$\beta$,17$\alpha$,21-triol-20-one 21-acetate, and
2-methyl-$\Delta^1$-allopregnene-11$\beta$,17$\alpha$,21-triol-20-one 21-acetate.

*Example V*

A solution of 1 g. of $\Delta^1$-allopregnene-11$\beta$,17$\alpha$,21-triol-20-one 21 acetate in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave $\Delta^1$-allopregnene-17$\alpha$,21-diol-11,20-dione 21-acetate.

The rest of the final compounds of Example IV, were converted by the above procedure, respectively, into:

$\Delta^{1,3}$-allopregnadiene-17$\alpha$,21-diol-11,20-dione 21-acetate,
2-methyl-$\Delta^{1,3}$-allopregnadiene-17$\alpha$,21-diol-11,20-dione 21-acetate, and
2-methyl-$\Delta^1$-allopregnene-17$\alpha$,21-diol-11,20-dione 21-acetate.

*Example VI*

The final compounds of the preceding example were saponified in accordance with Example II, thus affording respectively:

$\Delta^{1,3}$-allopregnene-17$\alpha$,21-diol-11,20-dione,
$\Delta^{1,3}$-allopregnadiene-17$\alpha$,21-diol-11,20-dione,
2-methyl-$\Delta^{1,3}$-allopregnadiene-17$\alpha$,21-diol-11,20-dione, and
2-methyl-$\Delta^1$-allopregnene-17$\alpha$,21-diol-11,20-dione.

*Example VII*

The starting compounds of Example IV were treated following exactly the procedure described in that example, except that acetic anhydride was substituted by caproic anhydride, propionic anhydride, enanthic anhydride and cyclopentylpropionic anhydride thus affording respectively the corresponding 21-caproates, 21-propionates, 21-enanthates and 21-cyclopentylpropionates of said starting compounds.

*Example VIII*

The final compounds of Example VI were treated following exactly the procedure described in Example IV except that acetic anhydride was substituted by caproic anhydride, propionic anhydride, enanthic anhydride and cyclopentylpropionic anhydride thus affording respectively the corresponding 21-caproates, 21-propionates, 21-enanthates, and 21-cyclopentylpropionates of said final compounds.

I claim:
1. A compound of the following formula:

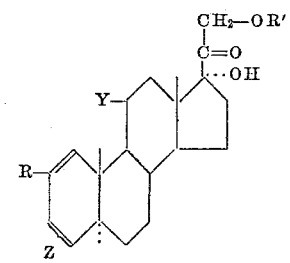

wherein R is selected from the group consisting of hydrogen and methyl; $R^1$ is a member of the group consisting of hydrogen and a hydrocarbon carboxylic acyl group of less than 12 carbon atoms; Y is selected from the group consisting of β-hydroxy and keto and Z is a member of the group consisting of a double bond and a saturated linkage, each between C–3 and C–4.

2. $\Delta^1$-allopregnene-11β,17α,21-triol-20-one.
3. 2-methyl-$\Delta^1$-allopregnene-11β,17α,21-triol-20-one.
4. $\Delta^{1,3}$-allopregnadiene-11β,17α,21-triol-20-one.
5. 2-methyl-$\Delta^{1,3}$-allopregnadiene-11β,17α-21-triol-20-one.
6. $\Delta^1$-allopregnene-17α,21-diol-11,20-dione.
7. 2-methyl-$\Delta^1$-allopregnene-17α,21-diol-11,20-dione.
8. $\Delta^{1,3}$-allopregnadiene-17α,21-diol-11,20-dione.
9. 2-methyl-$\Delta^{1,3}$-allopregnadiene-17α,21-diol-11,20-dione.
10. $\Delta^1$-allopregnene-11β,17α-21-triol-20-one-21-acetate.
11. 2-methyl-$\Delta^1$-allopregnene-11β,17α,21-triol-20-one-21-acetate.
12. $\Delta^{1,3}$-allopregnadiene-11β,17α,21-triol-20-one-21-acetate.
13. 2-methyl-$\Delta^{1,3}$-allopregnadiene-11β,17α,21-triol-20-one-21-acetate.
14. $\Delta^1$-allopregnene-17α,21-diol-11,20-dione-21-acetate.
15. 2-methyl-$\Delta^1$-allopregnene-17α,21-diol-11,20-dione-21-acetate.
16. $\Delta^{1,3}$-allopregnadiene-17α,21-diol-11,20-dione-21-acetate.
17. 2-methyl-$\Delta^{1,3}$-allopregnadiene-17α,21-diol-11,20-dione-21-acetate.

No references cited.